United States Patent [19]

Carré

[11] Patent Number: 4,502,573
[45] Date of Patent: Mar. 5, 1985

[54] AUTOMATIC-ADJUSTMENT DRUM BRAKE

[75] Inventor: Jean-Jacques Carré, Le Raincy, France

[73] Assignee: Societe Anonyme D.B.A., Paris, France

[21] Appl. No.: 355,399

[22] Filed: Mar. 8, 1982

[30] Foreign Application Priority Data

Mar. 31, 1981 [FR] France .............................. 81 06445

[51] Int. Cl.³ .............................................. F16D 65/52
[52] U.S. Cl. ........................ 188/79.5 P; 188/79.5 GE; 188/79.5 GC
[58] Field of Search ............ 188/79.5 GT, 79.5 GC, 188/79.5 K, 79.5 R, 79.5 GE, 79.5 P, 327-329, 196 BA, 196 B, 196 R, 196 F, 196 C, 106 F

[56] References Cited

U.S. PATENT DOCUMENTS

| 2,337,070 | 12/1943 | Alden et al. | 188/79.5 P X |
|---|---|---|---|
| 2,351,952 | 6/1944 | Goepfrich | 188/79.5 P X |
| 2,493,993 | 1/1950 | Neale | 188/79.5 P |
| 2,751,048 | 6/1956 | Super et al. | 188/79.5 P X |
| 3,339,678 | 9/1967 | Burnett | 188/79.5 P |
| 4,039,055 | 8/1977 | Meyer et al. | 188/79.5 GC |
| 4,217,973 | 8/1980 | Johns et al. | 188/79.5 P X |
| 4,222,467 | 9/1980 | Kluger et al. | 188/79.5 P X |
| 4,236,611 | 12/1980 | Claverie | 188/79.5 P |

FOREIGN PATENT DOCUMENTS

| 14632 | 8/1980 | European Pat. Off. |
|---|---|---|
| 2216857 | 8/1974 | France . |
| 2365060 | 4/1978 | France . |
| 1022467 | 3/1966 | United Kingdom . |
| 1268339 | 3/1972 | United Kingdom . |

Primary Examiner—Douglas C. Butler
Attorney, Agent, or Firm—Larry J. Palguta; Ken C. Decker

[57] ABSTRACT

The invention concerns an automatic-adjustment drum brake. The brake comprises a support plate (10) which slidably carries two brake shoes (12, 14). An anchoring block (24) is disposed between first ends (20, 22) of the brake shoes (12, 14). A brake actuator (28) is disposed between the other ends (30, 32) of the brake shoe (12, 14). The brake actuator (28) cooperates with one of the brake shoes by way of an adjusting lever (44), the free end of which engages a unidirectional coupling (55) having a locking direction (A) and an adjustment direction. A strut member (34) and a spring (40) also engage the adjusting lever. The force of the spring (40) is such that as long as the brake shoes (12, 14) do not bear against the drum, the lever (44) is urged in the adjustment direction and the lever (44) is urged by the brake actuator (28) in the locking direction (A) when the brake shoes (12, 14) bear against the drum. The invention may be utilized for braking motor vehicles.

5 Claims, 2 Drawing Figures

U.S. Patent   Mar. 5, 1985   4,502,573
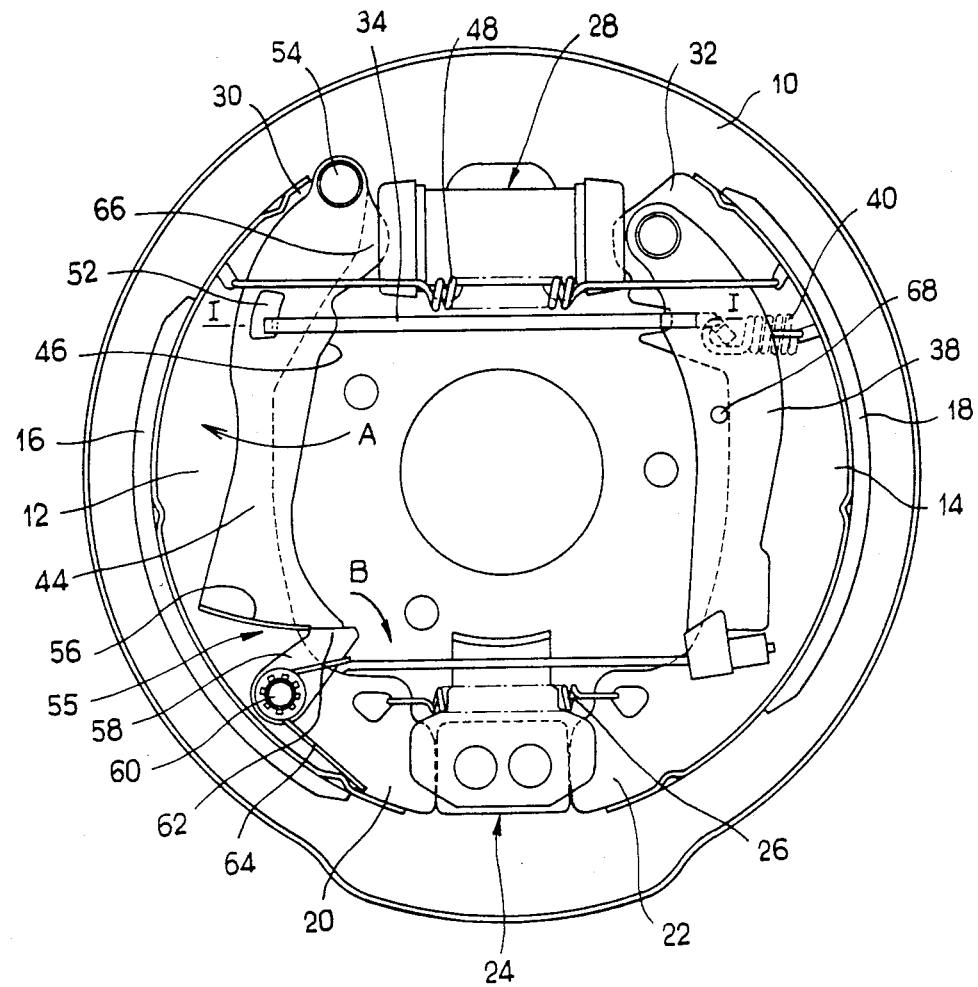
FIG_1
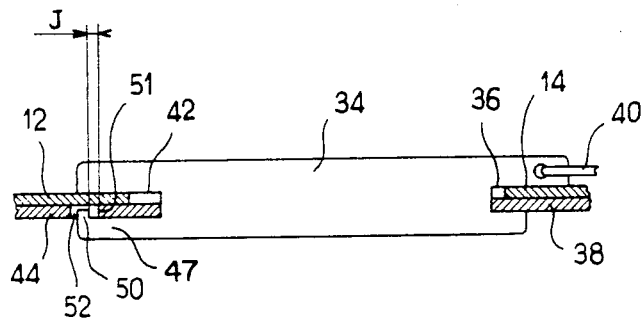
FIG_2

AUTOMATIC-ADJUSTMENT DRUM BRAKE

The invention concerns an automatic-adjustment drum brake, in particular for a motor vehicle.

The invention generally concerns a drum brake comprising two brake shoes which are resiliently urged into contact at one of their ends against an anchoring block and which are actuated at their other ends by a brake actuator, an adjusting lever mounted pivotally on one of said brake shoes and co-operating with a unidirectional coupling means providing for taking up wear of the friction linings.

Drum brakes of this type are liable to cause overadjustment due to mechanical deformation of the components of the brake during braking. It is then necessary to increase the clearance between the friction linings and the rotating drum to avoid a residual torque being produced, and this gives rise to an increase in the travel of the brake pedal.

An attempt has been made to overcome this problem by providing a means for locking the automatic adjustment when the brake is subjected to a torque (see in particular the French patent for which application was filed on Feb. 2, 1973 and which was published under the No. 2 216 857). This patent proposes adding, at the position of contact between a brake shoe and an anchoring block, a lever which bears on the one hand against the anchoring block and on the other hand against a pawl of the automatic adjustment device. In order that the automatic adjustment device can be operated, the brake shoe must be able to move away from the anchoring block under the effect of the lever and any adjustment is therefore impossible as soon as a braking torque occurs.

Although this arrangement does indeed avoid overadjustment when the brake is applied, nonetheless it suffers from the disadvantages of requiring an additional lever and spindle member, and resulting in the brake shoe being uncertain in regard to positioning thereof after the brake shoe has moved away from its anchoring block to permit the automatic adjustment system to operate.

To overcome these disadvantages, the invention proposes a drum brake comprising two brake shoes which are resiliently urged into contact at one of their ends against an anchoring block and which are actuated at their other ends by a brake actuator, an adjusting lever mounted pivotally on one of said brake shoes and co-operating with a unidirectional coupling means defining an adjusting direction and a locking direction, characterised in that the brake actuator co-operates with one of said brake shoes by way of said adjusting lever by urging said unidirectional coupling means in the locking direction, said adjusting lever also being urged by resilient means urging said unidirectional coupling means in the adjusting direction.

As will be seen in greater detail from the following description, the invention makes it possible to eliminate any additional component, while preventing overadjustment of the brake, without the danger of uncertain positioning of the brake shoes with respect to the anchoring block.

A preferred embodiment of the invention will be described by way of non-limiting example, with reference to the accompanying drawings in which:

FIG. 1 is a front view of a drum brake constructed in accordance with the invention, and FIG. 2 is a view of the brake in FIG. 1, in section taken along line I—I in FIG. 1.

The drum brake shown in FIGS. 1 and 2 comprises a brake support plate 10 which is provided to be associated with a fixed part (not shown) of the vehicle. The support plate 10 slideably carries two brake shoes 12 and 14 which are provided on their periphery with friction material 16 and 18 respectively which are secured to the brake shoes by means of rivets or equivalent (not shown). The ends 20 and 22 respectively of the brake shoes 12 and 14 are held applied against an anchoring block 24 by means of a spring 26. A brake actuator denoted generally by reference 28 and which is formed in the embodiment illustrated by a hydraulic wheel cylinder is disposed between the ends 30 and 32 respectively of the brake shoes 12 and 14. A strut member 34 is disposed between the brake shoes 12 and 14 in the vicinity of the brake actuator 28. As will be seen more particularly from FIG. 2, at one of its ends, the strut member 34 has a recess 36 which receives on the one hand the brake shoe 14 and on the other hand a hand brake lever 38 against which the strut member 34 bears, by means of the spring 40 which is fixed to the brake shoe 14. At the other of its ends, the strut member 34 has a second recess 42 which receives the brake shoe 12 and an automatic adjusting lever 44. The strut member 34 is held in contact against the projection 46 of the lever 44 by means of a brake shoe return spring 48. On an extension portion 47 the strut member 34 has a projection 50 which engages into an opening 52 in the lever 44, as will be seen more specifically from FIG. 2; the projection 50, with an inward edge 51 of the opening 52, defines a functional clearance J. The automatic adjusting lever 44 is mounted pivotally on the brake shoe 12 by means of a pivot-forming axis member 54 in the vicinity of the end 30 of the brake shoe 12.

The free end of the adjusting lever 44 co-operates with a unidirectional coupling means 55 formed by a toothed sector 56 which is carried by the free end of the lever 44 and which engages into a toothed sector 62 carried by a pawl mounted pivotally on the central web portion of the brake shoe 12 by means of a pivot-forming axis member 60, the toothed sector 62 being held in contact with the toothed sector 56 by means of a torsion spring 64. The contact region between the toothed sectors 56 and 62 is placed inwardly of the brake with respect to the line connecting the axis members 54 and 60, thereby defining a locking direction in the direction indicated by arrow A and an adjusting direction in the direction opposite to the arrow A, the pawl 58 then being capable of moving away in the direction indicated by arrow B against the force of the spring 64 to permit the teeth to move. The automatic adjusting lever 44 comprises a second projection 66 which is disposed between the axis member 54 and the first projection 46, so as to be disposed facing the wheel cylinder 28.

The mode of operation of the above-described brake is as follows:

When fluid is introduced under pressure into the brake cylinder 28, the brake shoes 12 and 14 move apart until the linings 16 and 18 thereon come into contact with the drum (not shown). In fact, the automatic adjusting lever 44 is urged in a pivotal movement in the direction indicated by arrow A by the wheel cylinder 28, but that direction A corresponds to the direction in which the unidirectional coupling means formed by the teeth 56 and the pawl 58 is in its locking position, and the brake shoe 12 is therefore moved away from the wheel cylinder 28 by way of the pivot-forming axis member 54. The brake shoe 14 is moved directly away from the wheel cylinder 28, by way of the end 32 thereof. The strut member 34 is engaged by the spring 40 to remain in contact with the inward edge of the hand brake lever 38, and to follow the movement of the brake shoe 14.

If, in order for the linings 16 and 18 of the brake shoes 12 and 14 to come into contact with the drum, the movement as between the strut member 34 and the adjusting lever 44 is greater than the clearance J between the projection 50 and the inward edge 51 of the opening 52 in the adjusting lever, the projection 50 comes into contact with the inward edge 51. The adjusting lever 44 is then urged with a pivotal movement in the opposite direction to the direction indicated by the arrow A, by the assembly comprising the strut member 34 and the spring 40.

The lever 44 is subjected to two oppositely acting moments with respect to its axis 54 of pivotal movement, one such moment being produced by the force of the wheel cylinder applied to the projection 66 and tending to cause the lever 44 to pivot in the direction of the arrow A, and the other moment being produced by the spring 40, by way of the strut member 34 which is applied to the inward edge 51 of the opening 52 and which tends to cause the lever 44 to pivot in the opposite direction to the direction indicated by the arrow A. The force of the spring 40 is such that it produces a moment which is greater than the moment applied by the wheel cylinder 28 to the projection 66, said moment being a function of the spring 48 and the force required for operating the unidirectional coupling means.

The adjusting lever 44 is entrained by the brake shoe 14 by way of the spring 40 and the strut member 34 and therefore, when the brake shoes move apart, before coming into frictional contact with the drum, the lever 44 pivots in the opposite direction to the arrow A.

When the friction linings 16 and 18 are in contact with the drum (not shown), any further movement of the brake shoes 12 and 14 corresponds to an increase in the force applied to the projection 66 by the wheel cylinder 28.

The force of the spring 40 is such that it produces a moment which is less than that produced by the wheel cylinder 28 when the latter presses the friction linings against the drum (not shown). As the spring 40 is incapable of opposing the movement of the lever 44 in the direction A, the lever 44 works in the direction in which the unidirectional coupling means is in its locking direction and therefore the lever 44 remains fixed with respect to the brake shoe 12. Any further movement of the brake shoes then correspond to an increase in the length of the spring 40, this occurring without movement of the lever 44 with respect to the brake shoe 12.

When the hydraulic pressure falls in the wheel cylinder 28 in a first phase, the brake shoes move towards each other, the wheel cylinder 28 maintaining a sufficient force on the lever 44 to oppose the action of the spring 40. In a second phase, the strut member 34 and more precisely the projection 50 moves away from the edge 51 of the opening 52, thereby rendering the spring 40 inoperative. When the hydraulic pressure in the wheel cylinder 28 is reduced to zero, the brake shoes 12 and 14 have come to bear against the strut member 34 respectively by way of the adjusting lever 44 and the hand brake lever 38, the rest position of which is defined by the projection 68 bearing against the shoe 14.

It will be noted that, in a brake of this kind, over-adjustment due to deformation greater than the predetermined clearance J between the projection 50 and the inward edge 51 of the opening 52 is made impossible because the adjusting device is neutralised as soon as a predetermined pressure on the friction linings occurs, the lever 44 urging the unidirectional coupling means in the locking direction, by means of suitable dimensioning of the spring 40 which experiences an increase in length for a predetermined force produced by the wheel cylinder.

It will be appreciated that any over-adjustment due to deformation being impossible, the functional clearance can be reduced, without the addition of further components.

It will be appreciated that the embodiment described is not limiting and in particular the hand brake lever is not necessary for performing the invention, and likewise any unidirectional coupling means disposed on the automatic adjusting lever, other than that described, can be employed, and likewise the relative positions of the points at which the moments are applied to the adjusting lever may be altered, without thereby departing from the scope of the invention.

I claim:

1. A drum brake assembly with an automatic brake shoe wear adjustment mechanism responsive to the application of different magnitudes of force applied by actuating means on an adjusting member and coupling means to prevent over-adjustment of brake shoes, comprising: a drum, a support member, a pair of brake shoes mounted on said support member in end-to-end relationship, actuating means disposed between one pair of adjacent shoe ends, anchoring means disposed between the other pair of adjacent shoe ends, an adjusting member pivotally mounted to one of said shoes, said actuating means engaging the end of other shoe and said adjusting member for direct displacement of the adjusting member when the actuating member is actuated, unidirectional coupling means between said one brake shoe and said adjusting member for allowing pivotal movement of said adjusting member in a direction toward the other of said shoes and prohibiting movement in the opposite direction, retraction means for interconnecting and urging said shoes into deactivated position, a strut extending between said brake shoes and having a lost-motion connection with said adjusting member for pivoting said adjusting member upon displacement of said shoes beyond a predetermined amount fixed by said lost-motion connection, said actuating means engaging the adjusting member at a point between the axis of pivotal movement of the adjusting member and a point of engagement of the adjusting member with the strut to render the adjusting member and coupling means operatively responsive to different magnitudes of force exerted thereon by said actuating means, and resilient means between said strut and other shoe, whereby outward displacement of said shoes by said actuating means to engage the shoes with the drum and exceeding said predetermined amount effects pivoting of the adjusting member to adjust the deactivated position of said shoes, and engagement of the actuating means with said adjusting member in cooperation with said resilient means prevents further pivoting of the adjusting member when the shoes experience subsequent outward displacement.

2. The drum brake assembly in accordance with claim 1, wherein said resilient means applies to said adjusting member a force that is less than the amount of force applied to said adjusting member by the actuating means when the brake shoes contact the drum, whereby said adjusting member urges said unidirectional coupling means in a locking direction.

3. The drum brake assembly in accordance with claim 2, further comprising lever means connected to the other shoe and the resilient means comprising a spring connected to the strut and other shoe for urging said strut into bearing engagement with said lever means.

4. The drum brake assembly in accordance with claim 2, wherein the engagement of the actuating means with the adjusting member prevents, upon engagement of the shoes with the drum, further adjustment of the adjusting member due to heat expansion of parts of the drum brake assembly.

5. The drum brake assembly in accordance with claim 1, wherein said predetermined amount is achieved by a strut projection disposed in an opening of the adjusting member, the strut in the deactivated position bearing against said adjusting member.

* * * * *